United States Patent Office 3,503,984
Patented Mar. 31, 1970

3,503,984
4-PHENYLPIPERIDINE BIGUANIDES
Erhard Schenker, Basel, and Klaus Hasspacher, Riehen, Switzerland, assignors to Sandoz Ltd. (also known as Sandoz A.G.), Basel, Switzerland
No Drawing. Filed Feb. 15, 1968, Ser. No. 705,596
Claims priority, application Switzerland, Feb. 20, 1967, 2,437/67; July 12, 1967, 9,955/67; July 27, 1967, 10,182/67
Int. Cl. C07d 29/26, 27/32; A61k 27/00
U.S. Cl. 260—293                          6 Claims

ABSTRACT OF THE DISCLOSURE

The present invention provides compounds represented by the formula:

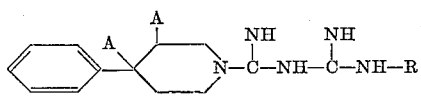

wherein R is hydrogen or lower alkyl, and each of the two symbols A are hydrogen, or together they are a second bond, and pharmaceutically acceptable acid addition salts thereof.
The compounds exhibit useful blood sugar lowering properties in warm-blooded animals.

The present invention relates to new heterocyclic biguanide derivatives and processes for their production.
The present invention provides heterocyclic biguanide derivatives of Formula I,

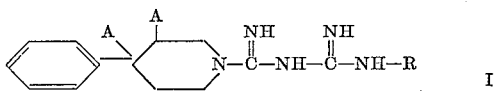  I in which R signifies a hydrogen atom or a lower alkyl radical, and each of the two symbols A signifies a hydrogen atom or together they signify a second bond, and their acid addition salts.
The present invention further provides the following two processes for the production of compounds of Formula I and their acid addition salts, characterized in that
(a) A compound of Formula II,

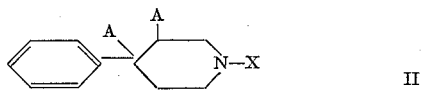
 II and a compound of Formula III,

Y—NH—R                     (III)

in which formulae R and the two symbols A have the above significance, one of the symbols X and Y signifies a hydrogen atom, and the remaining symbol signifies the N-cyano-carboxamidine radical,
are heated together in the presence of at least 1 equivalent of an acid, or
(b) A compound of Formula Ia,

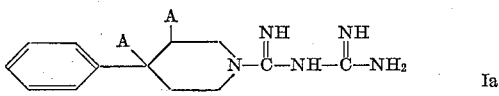 Ia in which the two symbols A have the above significance, is produced by reacting a compound of Formula IIa,

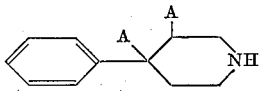

in which the two symbols A have the above significance, with a pyrazol derivative of Formula IV,

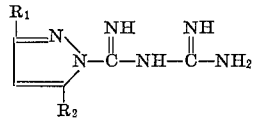 IV in which each of the two symbols $R_1$ and $R_2$ signify hydrogen, lower alkyl, aryl or aralkyl,
in the presence of at least one equivalent of an acid, in a suitable organic solvent, and where the free base of the resulting acid addition salt of the compound of Formula I is required, this is liberated with an alkali.
The processes may, for example, be effected as follows:
(a) The chemical reaction of the first process consists in the addition of a basic amino radical to the cyano radical of a cyanoguanidine derivative; this reaction requires the presence of at least one equivalent of an acid. 4-phenylpiperidine or 4-phenyl-1,2,3,6-tetrahydropyridine may, for example, be used as amino component and dicyano diamide or methyl-dicyano diamide as the cyano component, or methylamine is used as amino component and N-cyano-4-phenylpiperidine-1-carboxamidine as the cyano component.
In accordance with one method of the process, an acid addition salt, e.g. the hydrochloride, of the amino component is heated to a high temperature together with the cyano component, until the mixture has completely melted. The reaction in the resulting melted material takes place at a temperature between 140° and 200° C. and has a duration of a few minutes to five hours; the reaction mixture usually crystallizes completely or solidifies to a glassy mass upon cooling or already while heating.
In accordance with another method of the process, an acid addition salt, e.g. the hydrochloride, of the amino component is heated to the boil under reflux with the cyano component in a suitable organic solvent, e.g. pyridine, for about 5 to 10 hours. The resulting salt of compound I usually is obtained in the form of a crystalline precipitate and may be isolated by filtration after cooling the reaction mixture. When, however, no precipitate results, the solvent is evaporated until crystallization commences or to dryness, after the reaction is completed.
In accordance with a further method of the process the amino and the cyano component are heated under reflux for several hours in an aqueous acid solution, e.g. 3 N hydrochloric acid, and the reaction solution is subsequently concentrated by evaporation in a vacuum.
(b) The chemical reaction of the second process consists in the transference of an N-amidino-carboxamidine radical from the 1 position of a pyrazol derivative IV to the secondary nitrogen atom of a compound IIa. The resulting reaction product is a compound of Formula Ia in the form of an acid addition salt and a 1 unsubstituted pyrazol derivative of Formula V,

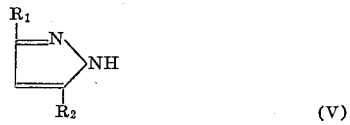 (V)

in which $R_1$ and $R_2$ have the above significance.
The pyrazol derivative of Formula IV, e.g. N-amidino-1-pyrazol-carboxamidine, is preferably used in the form of an acid addition salt, e.g. the hydrochloride. Examples of suitable solvents are methylene chloride, chloroform, lower alkanols, e.g. methanol or ethanol, and ethyl acetate. The reaction is effected at room temperature or at elevated temperature, e.g. at the boiling temperature of the solvent, and has a duration of 4 to 24 hours.
In most cases, particularly when chloroform is used as solvent, the resulting acid addition salt of the compound Ia crystallizes in the reaction mixture and may be isolated by filtration; the pyrazol derivative of Formula V, which also results during the reaction, however, remains in solution. When, however, no precipitate results during the course of the reaction, particularly when a lower alkanol is used as solvent, the clear reaction solution is evaporated to dryness and the resulting acid addition salt of compound Ia is recrystallized from the residue.

The acid which is present in the two processes described may comprise a suitable mineral acid, such as hydrochloric acid. An acid which may affect the reactants or final products would of course not be suitable.

The embodiments of the process of the invention described above yield compounds of Formula I in the form of their acid addition salts, e.g., hydrochlorides, which may be purified in manner known per se, e.g., by crystallization from suitable solvents or solvent mixtures, e.g. methanol, ethanol, water and ethanol/ether. The corresponding free bases of Formula I may be obtained from the resulting salts by treating with as alkali, preferably with an anion exchange resin which has been previously treated with an alkali, or an alkali alcoholate. These bases may be converted into their acid addition salts by reacting with inorganic or organic acids. Examples of acids for acid addition salt formation are hydrochloric, hydrobromic, sulphuric, nitric, fumaric, maleic, tartaric, benzenesulphonic and N-cyclohexylsulphamic acid.

It is also possible, however, to exchange the anion in the resulting salts by a double reaction. Thus, for example, by treating the hydrochlorides with an aqueous silver sulphate or silver nitrate solution, the corresponding sulphates or nitrates are obtained, and the difficultly soluble silver chlorides result as by-products. Reaction of the sulphates with an aqueous barium chloride solution yields the corresponding hydrochlorides and the difficultly soluble barium sulphates in an analogous manner.

The starting materials of Formula IIb,

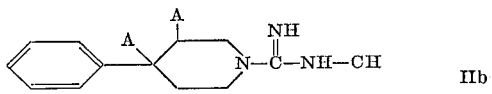

in which the two symbols A have the above significance, are new and form part of the present invention. These new compounds, which it will be seen comprise the one possibility of the compounds of Formula II employed in the first process, may be produced by reacting in a suitable organic solvent a known compound of Formula IIa, e.g. 4-phenylpiperidine, with an alkali dicyanimide, e.g. sodium dicyanimide, in the presence of at least one equivalent of an acid.

The pyrazol derivatives of Formula IV, wherein one or both of $R_1$ and $R_2$ have significances other than lower alkyl, are also new. The compounds of Formula IV may be produced by reacting a pyrazol derivative of Formula V in the presence of at least one equivalent of an acid, with dicyano diamide, either by melting together the pyrazol derivative V with dicyano diamide at 140–200° C., or by boiling under reflux the pyrazol derivative V with dicyano diamide in a dilute acid, e.g. 3 N hydrochloride acid.

The pyrazol derivatives of Formula IV may, however, also be obtained as follows:

An acid addition salt of a pyrazol-carboxamidine of Formula VI,

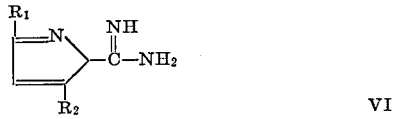

in which $R_1$ and $R_2$ have the above significance, in an organic solvent which is inert under the reaction conditions, e.g. chloroform, is treated with ½ an equivalent of a tertiary or a sterically hindered secondary or primary organic nitrogen compound, e.g. triethylamine or 1-amino-2,6-dimethylpiperidine, for about 2 hours and preferably at the boiling temperature of the solvent. ½ an equivalent of compound IV (as acid addition salt) and ½ an equivalent of the corresponding 1 unsubstituted pyrazol derivative of Formula V are obtained from one equivalent of the acid addition salt of the pyrazol-carboxamidine VI used.

The starting materials of Formulae V and VI used for the production of the pyrazol derivatives IV may be obtained in manner known per se from 1,3-dicarbonyl compounds of Formula VII,

in which $R_1$ and $R_2$ have the above significance, or from the corresponding acetals, by reacting with hydrazine or aminoguanidine.

The heterocyclic biguanide derivatives of Formula I produced in accordance with the invention have hitherto not been described in the literature. They are characterized by valuable pharmacodynamic properties and may be used as medicaments. Thus, in tests effected with diabetic rats (Dunn et al., Lancet 1943, 1, 484) 200 mg./kg. body weight of the compounds exhibit a pronounced blood-sugar lowering effect of long duration. Their toxicity is low in comparison with other guanidine compounds. The compounds of the invention are therefore useful in the treatment of conditions of diabetes mellitus, in which case they may be used alone or in mixture with other anti-diabetically effective medicaments, e.g. sulphonyl ureas, and are preferably administered per os. A suitable daily dosage of the Compounds I is from 1 to 10 mg. per kg. body weight of large warm-blooded animal, e.g. primates, preferably administered in equally divided doses 1 to 4 times daily.

In order to produce suitable medicinal preparations the new biguanide derivatives or their water-soluble, physiologically tolerated acid addition salts are worked up with the usual physiologically acceptable inorganic or organic adjuvants. Suitable medicinal preparations are for example tablets, dragées, capsules, syrups, injectable solutions. Aside from adjuvants, e.g. polyvinylpyrrolidone, methylcellulose, talcum, maize starch, magnesium stearate, stearic acid and sorbic acid, the preparations may also contain suitable preserving agents, sweetening and colouring substances and flavourings.

The expression "in manner per se" as used herein designates methods in use or described in the literature on the subject.

In the following non-limitative examples all temperatures are indicated in degrees centigrade and are uncorrected.

As already indicated, the free bases of the acid addition salts of the final compounds may be liberated by means of a suitable alkali.

EXAMPLE 1

N-amidino-4-phenylpiperidine-1-carboxamidine

A mixture of 8.5 g. of 4-phenylpiperidine hydrochloride (M.P. 163–165°) and 3.7 g. of dicyano diamide is melted by heating and heated to 160°, whereby the melted material solidifies after about 1 hour. The mixture is subsequently allowed to cool and is recrystallized from ethanol/ether, whereby the hydrochloride of the compound indicated in the heading, having a M.P. of 238–240°, is obtained.

EXAMPLE 2

N-amidino-4-phenyl-1,2,3,6-tetrahydropyridine-1-carboxamide 19.5 g. of 4-phenyl-1,2,3,6-tetrahydropyridine hydrochloride and 8.4 g. of dicyano diamide are triturated and the mixture is heated in an oil bath, whereby the material melts completely at 140–160°. After heating to 170° for 15 minutes the reaction mixture crystallizes completely. After cooling, the cooled crystalline mass is comminuted and recrystallized from water and then from ethanol/ether. The hydrochloride of the compound indicated in the heading has a M.P. of 225–226°.

EXAMPLE 3

N-(N$^1$-methylamidino)-4-phenylpiperidine-1-carboxamidine 9.8 g. of 4-phenylpiperidine hydrochloride are heated to 160° for 3 hours with 4.9 g. of methyl-dicyano diamide, whereby the material melts completely. After cooling the solidified melted material is crystallized from ethanol/ether; the hydrochloride of the compound indicated in the heading has a M.P. of 224–226°.

EXAMPLE 4

N-(N$^1$-methylamidino)-4-phenylpiperidine-1-carboxamidine

A mixture of 3.4 g. of methylamine hydrochloride and 11.4 g. of N$^1$-cyano-4-phenylpiperidine-1-carboxamidine is heated to 190° for 3 hours, whereby the material melts completely. After cooling the solidified material is pulverized and recrystallized from ethanol/ether.

The hydrochloride of the compound indicated in the heading has a M.P. of 224–226°.

The N$^1$-cyano-4-phenylpiperidine-1-carboxamidine used as starting material may be produced as follows:

8.9 g. of sodium dicyanimide and 19.4 g. of 4-phenylpiperidine hydrochloride are boiled at reflux in 200 cc. of N butanol while stirring for 4 hours. After cooling, filtration is effected, the filter residue is washed with water and is then recrystallized from ethanol. The resulting compound has a M.P. of 179–181°.

EXAMPLE 5

N-amidino-4-phenylpiperidine-1-carboxamidine 1.57 g. of 4-phenylpiperidine and 1.89 g. of N-amidino-1-pyrazol-carboxamidine hydrochloride are heated to the boil at reflux in 40 cc. of ethanol for 6 hours. The yellow solution is concentrated by evaporation in a vacuum and the resulting residue is crystallized from ethanol/ether after treating with active charcoal. The hydrochloride of the compound indicated in the heading has a M.P. of 238–240°.

The N-amidino-1-pyrazol-carboxamidine hydrochloride used as starting material may, for example, be produced as follows:

12.5 g. of 1-pyrazol-carboxamidine hydrochloride are suspended in 40 cc. of chloroform and 4.3 g. of triethylamine, dissolved in 10 cc. of chloroform, are added dropwise during the course of 5 minutes. While 1-pyrazol-carboxamidine hydrochloride slowly dissolves under the action of the base, N-amidino-1-pyrazol-carboxamidine hydrochloride commences to crystallize. The mixture is heated to the boil at reflux for 2 hours, is filtered and the filter residue is crystallized thrice from ethanol/ether; M.P. 172–174°.

EXAMPLE 6

Galenical preparation: tablets

| | G. |
|---|---|
| N-amidino-4-phenylpiperidine-1-carboxamidine Hydrochloride (compound of Examples 1 and 5) | 0.120 |
| Dimethylsilicone oil | 0.0005 |
| Magnesium stearate | 0.0010 |
| Polyethylene glycol 6000 | 0.0015 |
| Polyvinylpyrrolidone | 0.0040 |
| Talcum | 0.0050 |
| Maize starch | 0.010 |
| Lactose | 0.0380 |

For a tablet of 0.180

What is claimed is:

1. A compound selected from the group represented by the formula:

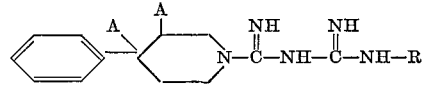

wherein R is hydrogen or lower alkyl, and each of the two symbols A are hydrogen, or together they are a second bond, and a pharmaceutically acceptable acid addition salt thereof.

2. A compound selected from the group represented by the formula:

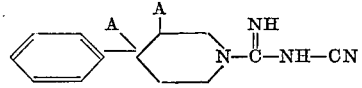

wherein each of the two symbols A are hydrogen or together they are a second bond.

3. A compound according to claim 1, which is N-amidino - 4 - phenylpiperidine - 1 - carboxamidine, or a pharmaceutically acceptable acid addition salt thereof.

4. A compound according to claim 1, which is N-amidino - 4 - phenyl - 1,2,3,6-tetrahydropyridine-1-carboxamidine, or a pharmaceutically acceptable acid addition salt thereof.

5. A compound according to claim 1, which is N-(N$^1$ - methylamidino)-4-phenylpiperidine-1-carboxamide, or a pharmaceutically acceptable acid addition salt thereof.

6. The compound according to claim 2, which is N$^1$-cyano-4-phenylpiperidine-1-carboxamidine.

References Cited

FOREIGN PATENTS 776,176   6/1957   Great Britain.

OTHER REFERENCES

Dawes et al., Brit. J. Pharmacol. 5, 65–76 (1950).

HENRY R. JILES, Primary Examiner

G. T. TODD, Assistant Examiner

U.S. Cl. X.R.

260—293.4, 294, 296, 310; 424—263, 267